No. 727,085. PATENTED MAY 5, 1903.
E. W. BURGESS.
DRAFT CONNECTION FOR MOWERS.
APPLICATION FILED JULY 19, 1902.
NO MODEL.
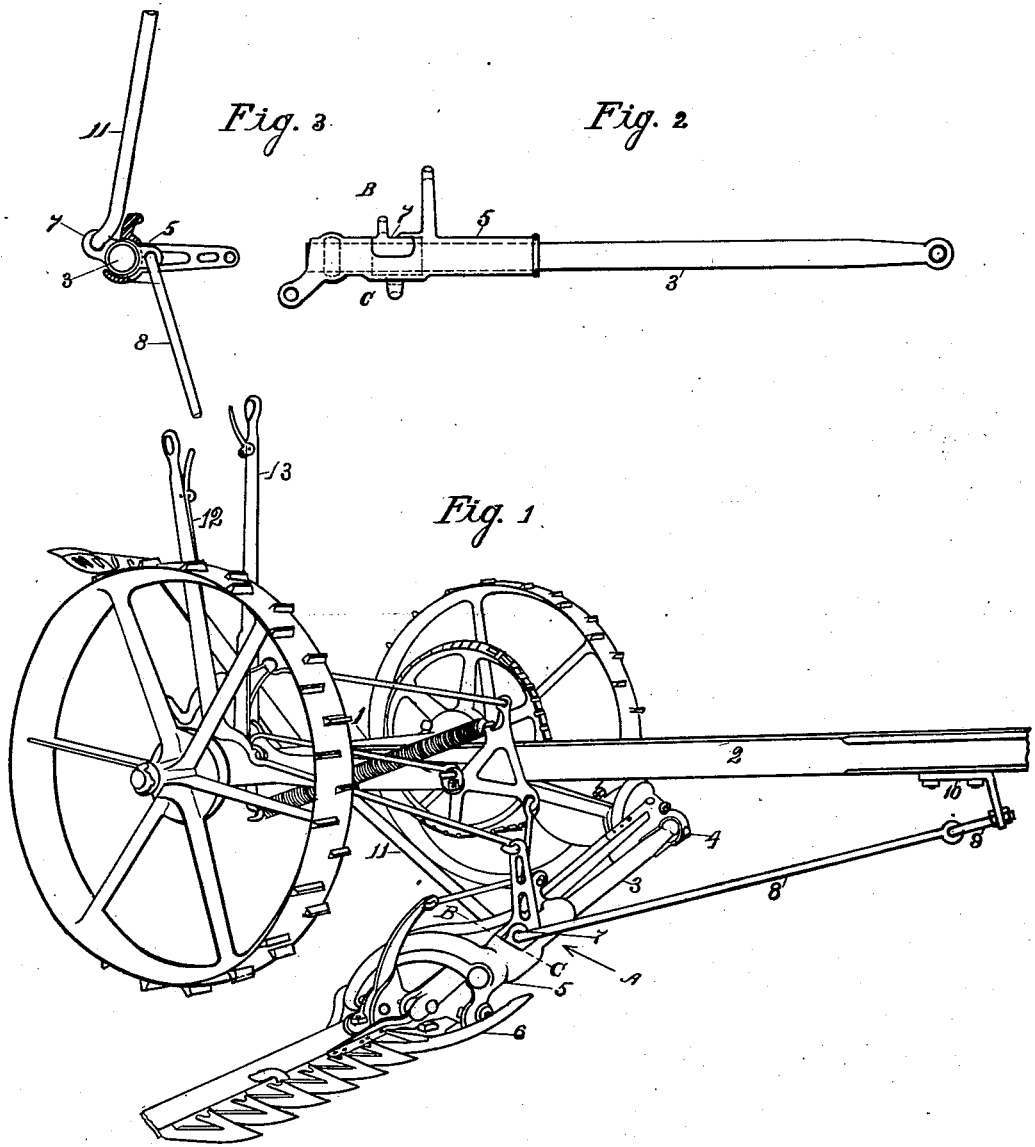
Witnesses
Inventor
E. W. Burgess
THE NORRIS PETERS CO., PHOTO-LITHO., WASHINGTON, D. C.

No. 727,085. Patented May 5, 1903.

UNITED STATES PATENT OFFICE.

EDWARD W. BURGESS, OF MILWAUKEE, WISCONSIN, ASSIGNOR TO INTERNATIONAL HARVESTER COMPANY, OF CHICAGO, ILLINOIS, A CORPORATION OF NEW JERSEY.

DRAFT CONNECTION FOR MOWERS.

SPECIFICATION forming part of Letters Patent No. 727,085, dated May 5, 1903.

Application filed July 19, 1902. Serial No. 116,211. (No model.)

*To all whom it may concern:*

Be it known that I, EDWARD W. BURGESS, a citizen of the United States, residing at Milwaukee, in the county of Milwaukee and State of Wisconsin, have invented certain new and useful Improvements in Draft Connections for Mowers, of which the following is a specification, reference being had to the accompanying drawings, forming a part thereof.

The main objects of my invention are to provide supporting and guiding connections for the cutting apparatus whereby the draft will be equally distributed between points of attachment to fixed parts of the machine both before and behind the cutting apparatus, the tendency of the rear or thrust connection to lift the driving-wheels and impair their tractive power and the downward pull of the front or draft connection on the pole will be reduced, and the cutting apparatus will be caused to move vertically in a stright line, and generally to improve the construction and operation of devices of this class.

The invention consists, essentially, in certain novel features of construction and in the arrangement and combinations of parts hereinafter particularly described, and pointed out in the claims.

In the accompanying drawings like numerals designate the same parts in the several figures.

Figure 1 is a perspective view of a mowing-machine to which my improved supporting and guiding connections for the cutting apparatus are applied. Fig. 2 is a front view of the coupling-brace and parts immediately associated therewith as viewed in the direction indicated by arrow A, Fig. 1; and Fig. 3 is a cross-section on the line B C, Figs. 1 and 2, including portions of the draft and push rods.

In the construction of mowing-machines of this class it has been customary to provide the cutting apparatus with a single supporting and guiding connection, either a front connection consisting of a draft-rod connecting the coupling-brace with the pole or a rear connection consisting of a push-rod connecting the coupling-brace with the frame of the machine. The push-rod connection alone has been found objectionable in that it tends to lift the driving-wheels, and thereby reduce their traction, and to increase the draft on the machine when the cutting apparatus encounters heavy or lodged grass or other obstructions to its free advance movement. Such a connection also interferes with the free elevation and tilting of the cutting apparatus when the latter engages grass or other obstructions on account of the arc movement which is caused by the push-rod and which causes the cutting apparatus to advance as it begins to rise. Furthermore, when a single connection of this kind is used a stiff heavy rod must be provided to withstand the thrust of the cutting apparatus thereon without bending. The draft-rod connection alone has, on the other hand, proved unsatisfactory for the following reasons: It causes a downward pull on the pole and on the necks of the team; it tends to throw the cutting apparatus up from the ground in case of increase in draft, as when the cutting apparatus runs into heavy or lodged grass or encounters obstructions, and it necessitates locating the cutting apparatus and the shoe at its inner end farther from the drive-wheel on account of the rearward arc movement caused by the draft-rod when the cutting apparatus is lifted.

The foregoing objections are partially avoided and the objects first stated are attained by my improved supporting and guiding connections hereinafter described.

Referring to the accompanying drawings, 1 designates the main frame of the machine, and 2 the pole, attached at its rear end to said frame. 3 is the coupling-brace, hinged or pivoted at one end, as at 4, to said frame, and 5 is a yoke journaled on the other end of said bar and free to turn a limited distance about its axis. To this yoke 5 is hinged or pivotally connected in a line transverse to the axis of the coupling-brace a shoe 6, which carries the finger-bar and knife or sickle. A lever 7 is fulcrumed or pivoted on the coupling-brace 3 within a recess formed therefor in the sleeve of the yoke 5, and it is capable of a vibratory movement on said coupling-brace independently of said yoke.

8 is a draft-rod pivotally connected at its rear end with one arm of the lever 7 and at its front end with an eyebolt 9, which is adjustably attached to a bracket 10 on the under side of the pole 2. 11 is a push-rod pivotally connected at its front end with the other arm of lever 7 and at its rear end with the main frame near the axle.

The sleeve of yoke 5 turns on the coupling-brace in the usual way when the cutting mechanism is tilted either manually or in following the undulations of the ground in the ordinary operation of the machine. The cutting mechanism is tilted manually by means of a lever 12 and the usual or any suitable connections. The coupling-brace and cutting apparatus are lifted and adjusted vertically by means of a lever 13 and the usual connections. When the coupling-brace and cutting apparatus are held against backward movement by means of a push-rod alone, the cutting apparatus when lifted will move in an arc of which the rear pivoted end of said push-rod is the center, and resistance to the advance of the cutting mechanism acting through said push-rod in an upward direction has a tendency to lift the main wheels, particularly that on the same side as the cutting apparatus, from the ground, and thus reduce their traction, by which the cutting apparatus is driven.

When a draft-rod alone is used in place of a push-rod to hold the coupling-brace and cutting apparatus against backward movement, resistance to the advance of the cutting mechanism will exert a downward pull on the pole, increasing the weight on the necks of the team, and will tend to lift the cutting apparatus from the ground. As hereinbefore stated, these objections to a single guiding and supporting connection either front or rear are obviated by the construction and arrangement of the combined front and rear supporting and guiding connections hereinbefore described. The lever 7 being free to turn on the coupling-brace 3 and the draft and push rods 8 and 11 being pivoted to its opposite ends, it serves to divide the draft on the cutting apparatus between said draft and push rods, the draft-rod through its connection with the pole pulling downward on the frame with the same force that the push-rod exerts an upward thrust on the frame, thereby maintaining the traction of the main wheels and the effective operation of the cutting apparatus. The equalizing-lever 7, the draft-rod 8, and the push-rod 11 constitute a parallel motion by which the coupling-brace and cutting apparatus are caused to move up and down in a straight perpendicular line.

Various changes in the minor details of construction and arrangement of parts may be made within the spirit and intended scope of the invention.

I claim—

1. In a mowing-machine the combination with the coupling-brace of a lever pivoted on said coupling-brace, and push and draft rods pivoted to said lever on opposite sides of its connection with the coupling-brace, substantially as described.

2. In a mowing-machine the combination with the frame, pole, coupling-brace and cutting apparatus attached to said coupling-brace, of a push-rod pivoted at its rear end to said frame, a draft-rod pivoted at its front end to said pole and an equalizing-lever pivoted to the other ends of said rods and at an intermediate point to said coupling-brace, substantially as described.

3. In a mowing-machine the combination with the coupling-brace, cutting apparatus attached thereto and means for vertically adjusting said cutting apparatus, of a lever pivoted to the coupling-brace and draft and push rods connecting said lever on opposite sides of its pivot with parts of the machine in front of and behind the cutting apparatus, substantially as described.

4. In a mowing-machine the combination with the frame and pole, of a coupling-brace pivoted to the frame and having a yoke journaled thereon, cutting apparatus attached to said yoke, a lever pivoted to the coupling-brace, and draft and push rods connecting the opposite ends of said lever with parts of the machine in front of and behind the cutting apparatus, substantially as described.

5. In a mowing-machine the combination with the coupling-brace pivoted to the frame of the machine at one end, and cutting apparatus attached to the other end of said brace, of supporting and guiding connections between said brace and parts of the machine before and behind it, confining the cutting apparatus in its up-and-down movements to an approximately straight path, substantially as described.

6. In a mowing-machine the combination with the coupling-brace pivoted at one end to the frame of the machine, and cutting apparatus having a jointed connection with the other end of said brace and capable of oscillating thereon, of supporting and guiding connections between said brace and parts of the machine before and behind it, confining the cutting apparatus in its up-and-down movements to an approximately straight path, substantially as described.

7. In a mowing-machine the combination with the coupling-brace pivoted at one end to the machine-frame, cutting apparatus attached to the other end of said brace, and means for vertically adjusting said cutting apparatus, of supporting and guiding connections between said brace and parts of the machine before and behind it, confining the cutting apparatus in its up-and-down movements to an approximately straight path, substantially as described.

8. In a mowing-machine the combination with the coupling-brace pivoted at one end to the machine-frame, cutting apparatus having a jointed connection with the other end of said brace, means for vertically adjusting said cutting apparatus, and means for tilting said cutting apparatus, of supporting and guiding connections between said brace and parts of the machine before and behind it, confining the cutting apparatus in its up-and-down movements to an approximately straight path, substantially as described.

In witness whereof I hereto affix my signature in presence of two witnesses.

EDWARD W. BURGESS.

Witnesses:
 FRANK J. DRYBURGH,
 EARLE J. BRYDEN.